United States Patent [19]

Dutchburn

[11] Patent Number: 4,476,777

[45] Date of Patent: Oct. 16, 1984

[54] COUNTERBALANCE DEVICE FOR ROTATABLE SHAFT

[76] Inventor: Leslie G. Dutchburn, 7 De Vere Gardens, Toronto, Ontario, Canada, M5M 3E4

[21] Appl. No.: 508,736

[22] Filed: Jun. 29, 1983

[51] Int. Cl.$^3$ ............................................. A47J 37/04
[52] U.S. Cl. ................................. 99/421 H; 73/468; 73/469
[58] Field of Search ............... 99/421 H, 419; 74/573; 73/468, 469, 470, 458

[56] References Cited

U.S. PATENT DOCUMENTS

| 1,343,954 | 6/1920 | Akimoff | 73/469 |
| 1,600,569 | 9/1926 | Sperry | 74/573 X |
| 2,014,838 | 9/1935 | Edwards | 74/573 X |
| 3,720,157 | 3/1973 | Van Bergen | 99/421 H |
| 3,960,067 | 6/1976 | Dutchburn | 99/421 H |

Primary Examiner—Billy J. Wilhite
Assistant Examiner—Christine A. Peterson

[57] ABSTRACT

A counterbalance device for a rotary shaft comprises a sleeve member in the form of a short tubing or a handle which can be mounted on the rotary shaft. The sleeve member has an extension rear portion adapted to receive a bushing member to be mounted thereon. The bushing member is provided with at least two aligned openings. A rod can be inserted through these openings and be mounted on the bushing member by a set screw. At least one counterbalance weight can then be mounted on the rod to provide counterbalance for uneven weight distribution with respect to the longitudinal axis of the rotary shaft.

5 Claims, 5 Drawing Figures

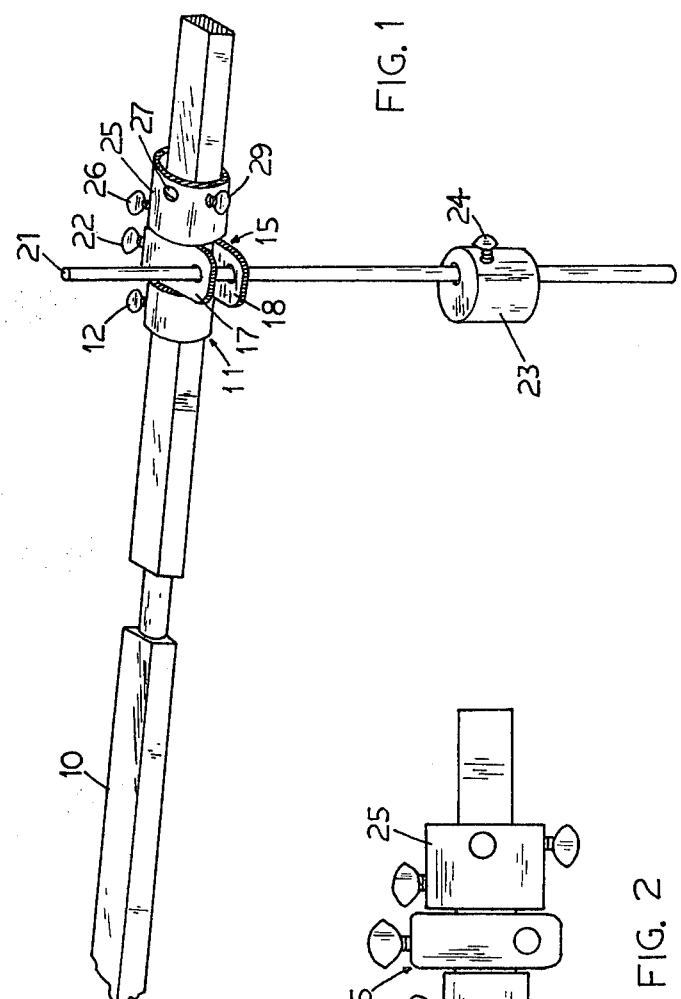

COUNTERBALANCE DEVICE FOR ROTATABLE SHAFT

BACKGROUND OF THE INVENTION

This invention relates to a counterbalance device attachable on a rotatable shaft to counterbalance unevenly distributed weight with respect to the longitudinal axis of the shaft, and particularly relates to a counterbalance device for use with a rotary spit of a rotisserie.

In a rotating shaft, it is essential that the weight distribution must be even with respect to the longitudinal axis of the shaft in order that the shaft may rotate in a smooth motion. Such requirement is even more severe when the shaft is positioned not in a vertical manner. An uneven weight distribution in such a shaft would cause it to rotate erratically. In half of the rotating cycle the shaft is lugging or raising the heavier portion of the weight with respect to one side of its longitudinal axis so that its speed would slow down, while in the other half of the cycle the heavier weight is exerting a downward pivotal moment to the shaft causing it to rotate faster.

In a cooking rotisserie the erratic rotation of the spit would cause the food to be cooked unevenly. In a rotary shaft for carrying workpieces to be processed or sprayed in a manufacturing system the uneven rotation of the shaft would cause the workpieces to sprayed unevenly or processed in an uncontrollable runaway fashion. Furthermore, the erratic rotation results in that the windings of the drive motor for the rotating shaft becomes over-heated and burnt out.

In U.S. Pat. No. 3,960,067 issued on June 1, 1976 to Leslie G. Dutchburn, entitled "COUNTERBALANCE FOR ROTARY SPIT", a counterbalance device is shown for use with a rotisserie spit. The device primarily consists of a U-shaped yoke bracket which can be positioned on the spit to clasp the latter, and a rod carrying a counterbalance weight is mounted to the spit through the U-shaped bracket. The length of the rod and the position of the weight may be adjusted to provide the required counterbalance to the uneven weight distribution with respect to the longitudinal axis of the spit.

However, since rotating shafts may have various cross sectional shapes, such as round, square or pentagonal, or may have various cross sectional size, it is sometimes difficult to mount such U-shaped yoke bracket on the shaft directly, resulting in that the adjustment for the perfect counterbalance to the uneven weight distribution may be hampered.

PURPOSE OF THE INVENTION

It is a principal object of the present invention to provide a counterbalance device which may be mounted securely on a rotary shaft independent of its cross sectional shape and a range of common diameter sizes.

It is an object of the present invention to provide a counterbalance device having freedom of counterbalance weight adjustment independent of the shape and size of the rotary shaft on which it is mounted.

It is an object of the present invention to provide a counterbalance device which may be attached to the end of a rotary shaft.

It is yet another object of the present invention to provide a counterbalance device which may be easily incorporated on the handle of a rotary shaft such as a rotisserie spit.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

FIG. 1 is a perspective view showing one embodiment of the counterbalance device according to the present invention mounted on a spit of a rotisserie.

FIG. 2 is a top elevation view of the counterbalance device according to the present invention.

DESCRIPTION OF SPECIFIC EMBODIMENTS

Figure 3:
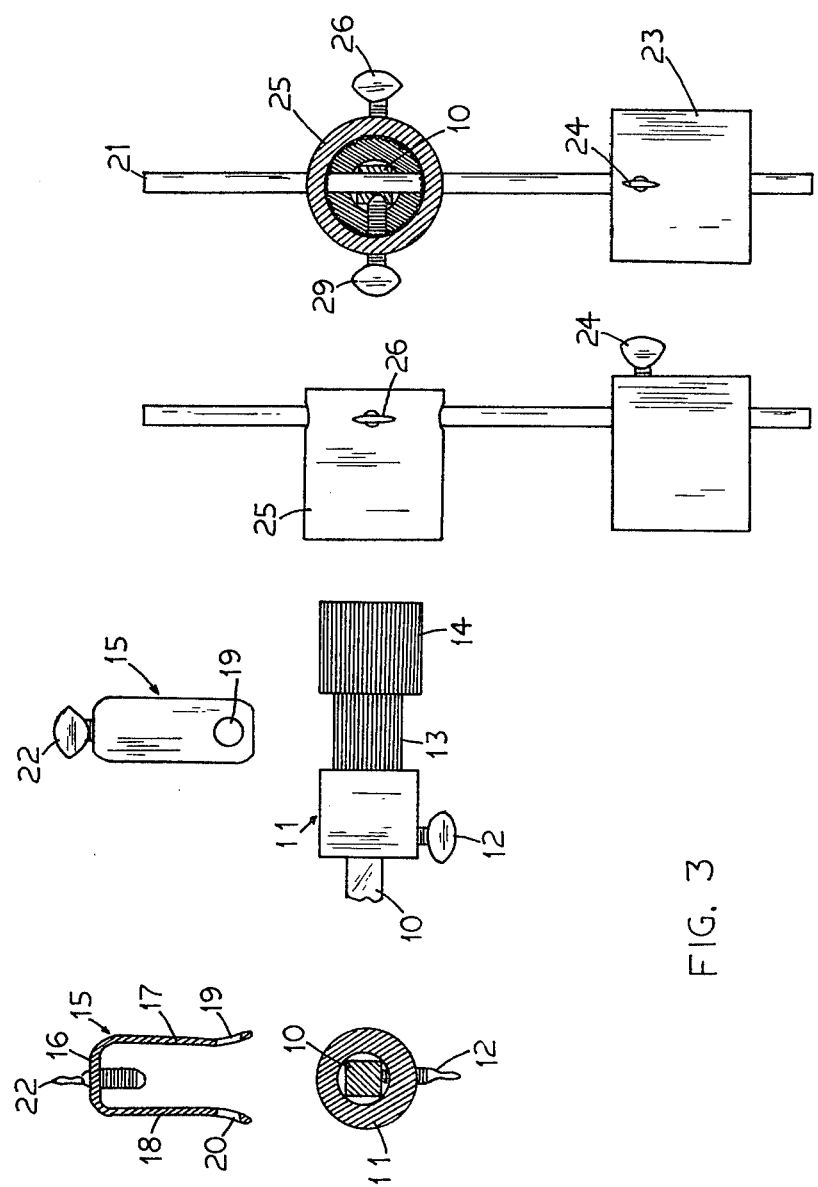
FIG. 3 is an exploded view of the counterbalance device according to the present invention mounted at the end of a rotary shaft having a square cross sectional shape.

Referring now to the drawings, all parts shown, unless otherwise indicated, are made of metal such as steel. A rotary shaft in the form of a rotisserie spit 10 is partially shown in FIG. 1. A sleeve member 11 is generally cylindrical in shape and is operative to mount on the split 10 by sliding thereon. A set screw 12 is provided on the the sleeve member 11 for securing it to the spit 10 at a selected position. The middle portion 13 of the sleeve member 11 has a smaller diameter, and both the middle portion 13 and the rear portion 14 have a knurled surface. A U-shaped yoke bracket 15 may be slidably mounted in a straddle manner at the middle portion 13 of the sleeve member 11. The yoke bracket 15 has a width generally equal to or slightly less than the length of the middle portion 13, also the web portion 16 of the yoke bracket 15 has a length equal to the diameter of the middle portion 13. The spacing between the leg portion 17 and 18 of the yoke bracket 15 may be formed slightly convergent towards each other near the free end therein such that once the yoke bracket 15 is forced-fitted onto the middle portion 13 of the sleeve member 11 it can not fall out therefrom yet is free to rotate thereon. The yoke bracket 15 is also restrained by the larger diameter front and rear portions of the sleeve member 11 such that it cannot slide sideways on the sleeve member 11. Two aligned openings 19 and 20 are formed on the leg portions 17 and 18 of the yoke bracket 15 for receiving a rod 21 to be inserted therethrough. A set screw 22 is provided at the web portion 16 of the yoke bracket 15, so that after the rod 21 has been inserted through the openings 19 and 20 the set screw 22 can be adjusted to cause the leg portion 17 and 18 to pull the rod 21 towards the sleeve member 11 so as to clamp securely onto the middle portion 13. The knurled surface of the middle portion 13 enhances the clamping action, thus after tightening the set screw 22 the yoke bracket 15 can not be rotated with respect to the sleeve member 11 even with considerable pivotal force exerted thereon.

A counterbalance weight 23 in the form of a cylindrical mass is slidably mounted on the rod 21 and is secured in place at a selected position thereon by a set screw 24. The position of the counterbalance weight may thus be adjusted to provide the required counterbalance for the uneven weight distribution with respect to the longitudinal axis of the rotary shaft 10. It will be appreciated that more than one counterbalance weight 23 may be mounted on the rod 21 to provide the required counterbalance, if necessary. Moreover, counterbalance weight 23 may be provided on both sides of the rod 21 with respect to the yoke bracket 15 to obtain the desired counterbalance. Commonly, one counterbalance weight 23 is sufficient to provide the necessary counterbalance for many situations encountered in use.

A cylindrical bushing member 25 is slidably mounted on the rear portion 14 of the sleeve member 11. The cylindrical bushing member 25 has an inside diameter slightly larger than the rear portion of the sleeve member 11, and it has a length about one-third longer than the latter. A set screw 26 is provided thereon for securing it to the sleeve member 11. The knurled surface of the rear portion 14 of the sleeve member 11 also enhances the securement, such that once the set screw 26 is tightened the cylindrical bushing member 25 may not be rotated with respect to the sleeve member 11 even with considerable rotating moment exerted thereon. At least two aligned openings 27 and 28 are formed on the rear portion of the cylindrical bushing member 25 which extends beyond the rear end of the rear portion 14 of the sleeve member 11. More than two aligned openings may be formed in the bushing member 25 to provide various selected positions that the rod 21 may be mounted thereto so as to provide a plurality of possible counterbalance adjustments.

When the sleeve member 11 is mounted at the end of the rotary shaft 10, the rod 21 together with the counterbalance weight 23 may be mounted on the cylindrical bushing member 25 through the openings 27 and 28 with the provision of a set screw 29.

It can be understood by those skilled in the art that when the counterbalance device hereinbefore described is mounted at the end of the rotary shaft the bushing member 25 and the counterbalance weight assembly may provide all the necessary freedom of adjustment for counterbalancing and the U-shaped yoke bracket 15 may be removed from the sleeve member 11 or be left on it as an unused auxiliary attachment.

Figure 4:
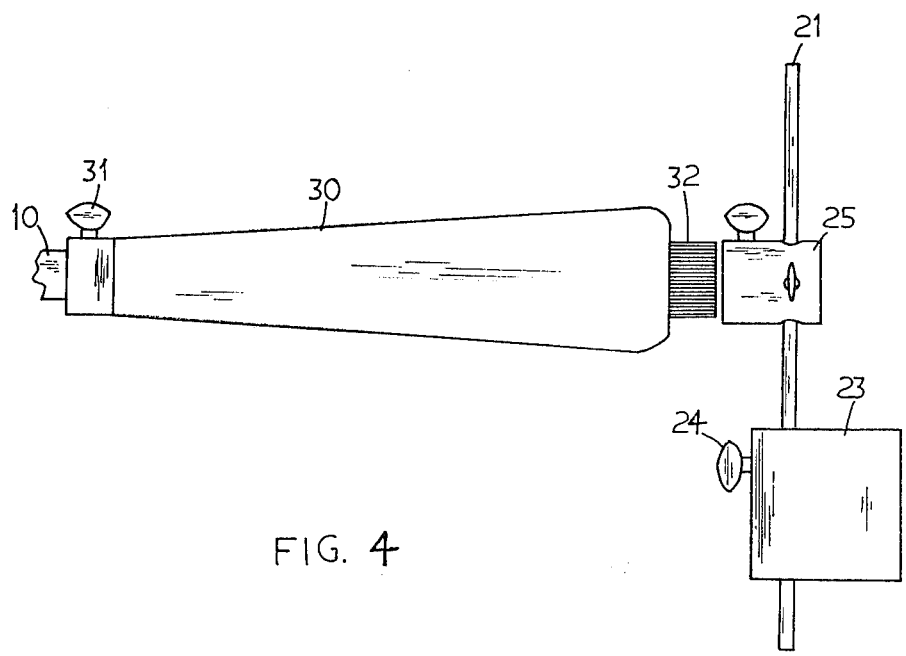
FIG. 4 is a side elevation view of a second embodiment of the counterbalance device according to the present invention.

As best shown in FIG. 4, the sleeve member according to the present invention may also be in the form of a handle 30 detachably or permanently secured to the end of the rotary shaft 10. A securing means such as a set screw 31 may be provided to secure the handle 30 to the rotary shaft 10. A rear cylindrical extension portion 32 similar to the rear portion 14 of the sleeve member 11 is provided on the handle 30 for mounting the bushing member 25 and the rod together with the counterbalance weight in the same manner as previously described.

Figure 5:
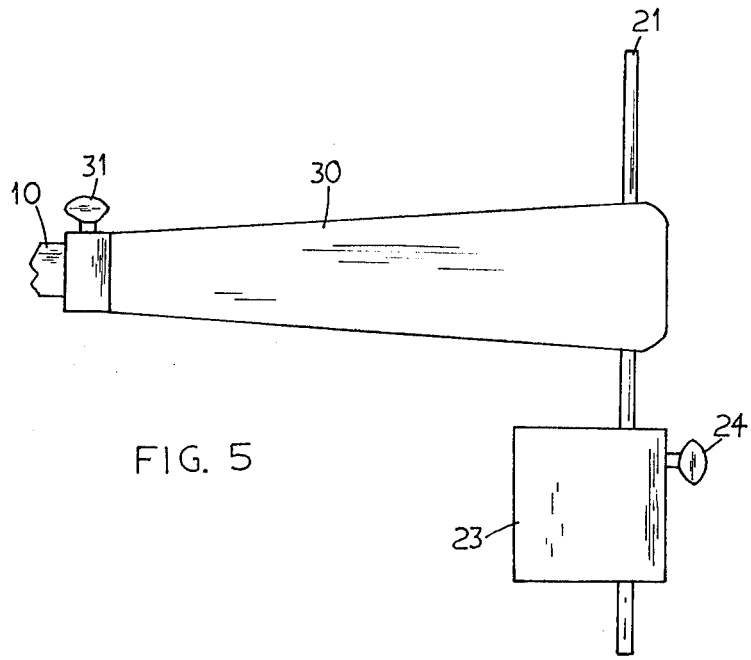
FIG. 5 is a side elevation view of a variation of the second embodiment of the counterbalance device shown in FIG. 4.

While the invention has been particularly shown and described with reference to preferred embodiments thereof, it will be understood by those skilled in the art that various changes in form and details may be made therein without departing from the spirit and scope of the present invention. For example, a transverse through opening may be provided in the handle 30 such that the rod and the counterbalance weight may be directly mounted to the handle by a set screw as best shown in FIG. 5.

What I claim as new and desire to protect by Letters Patent of the United States is:

1. A counterbalance device for a rotary shaft comprising,
    a handle means detachably mounted to one end of said shaft, said handle means having a securing means operative to secure said handle means to said shaft and being adjustable to permit said handle means to be rotated with respect to said shaft,
    an extension member formed at a rear end of said handle means,
    a bushing member operative to be mounted to said extension member, said bushing member having an adjusting means operative to secure said bushing member to said extension member,
    at least two aligned openings in said bushing member,
    a rod member operative to be inserted through said openings of said bushing member,
    a fastening means in said bushing member operative to secure said rod member on said bushing member,
    at least one weight means slidably mounted at selected postion on said rod member whereby to provide counterbalance for uneven weight distribution with respect to the longitudinal axis of said shaft.

2. A counterbalance device according to claim 1 wherein said extension member has a knurled surface.

3. A counterbalance device for a rotary shaft comprising, a sleeve member operative to couple to said shaft, said sleeve member having a securing means operative to secure said sleeve member at a selected position along said shaft, said sleeve member is a cylindrical tubular member having a front portion, a middle portion and a rear portion, said middle portion having a smaller diameter than said front portion and rear portion, a U-shaped yoke member operative to engage in a straddle manner, said middle portion of said sleeve member, said yoke member having two leg portions and a web portion, said leg portions having at least two openings, a rod member operative to be inserted through said openings, said web portion having an adjustable means operative to cause said yoke member and said rod member cooperatively to clamp securely on said sleeve member, at least one weight means slidably mounted on said rod member at a selected position thereon whereby to provide counterbalance for uneven weight distribution with respect to the longitudinal axis of said shaft.

4. A counterbalance device according to claim 3 including a bushing member operative to couple over said rear portion of said sleeve member, when said sleeve member is positioned at one end of said shaft, said bushing member having a securing means operative to secure said bushing means to said sleeve member, said bushing member having two aligned openings operative to receive said rod member to be inserted alternatively therethrough, a set screw means operative to secure said rod member on said bushing member whereby said weight means is slidably and selectively mounted on said rod member to provide counterbalance for said uneven weight distribution on said shaft.

5. A counterbalance device according to claim 4 wherein said middle portion and rear portion of said sleeve member have knurled surfaces.

* * * * *